UNITED STATES PATENT OFFICE.

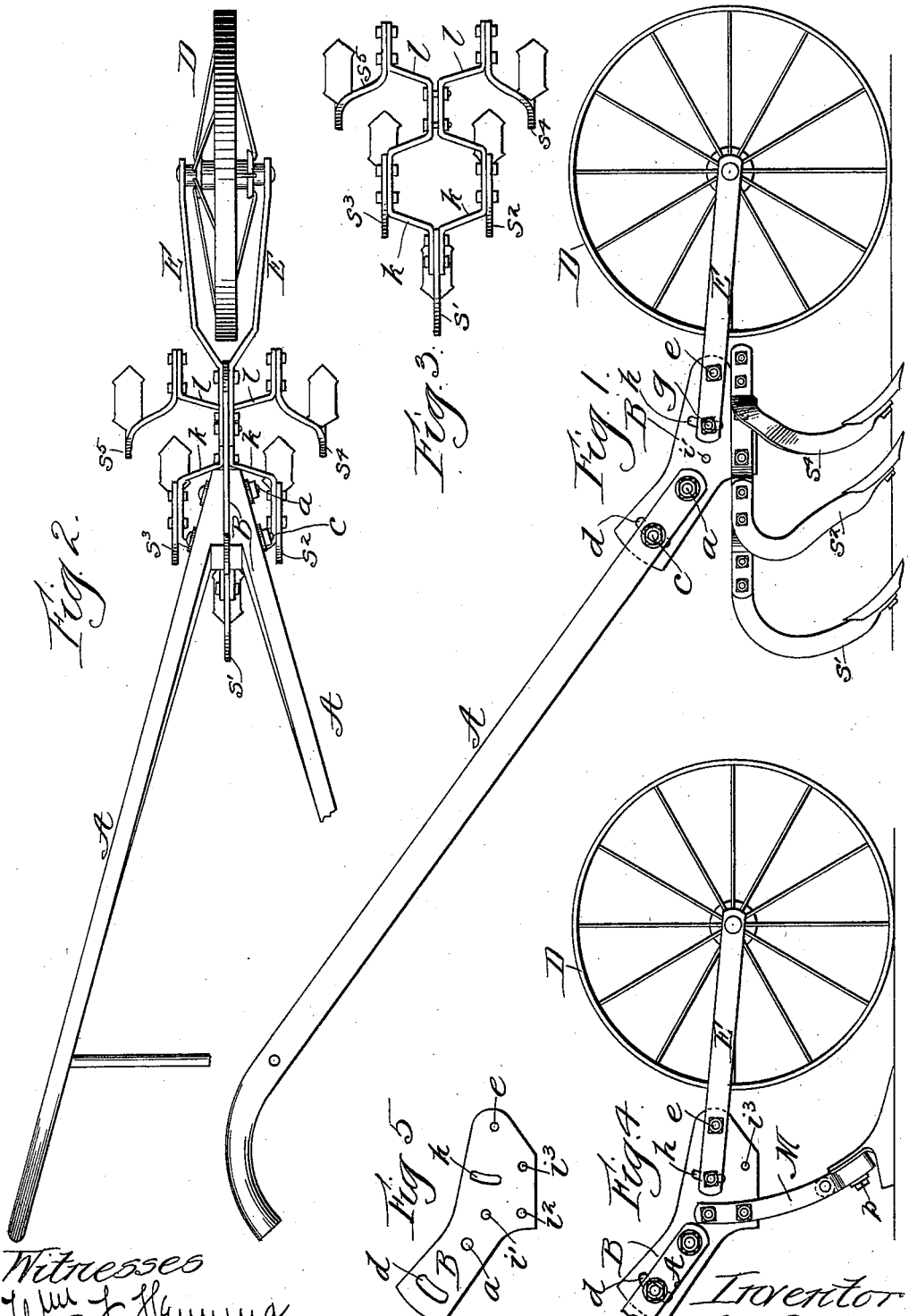

DAVID M. MOTHERWELL, OF CHICAGO, ILLINOIS, ASSIGNOR TO THE WHITMAN & BARNES MANUFACTURING COMPANY, OF AKRON, OHIO.

CULTIVATOR.

SPECIFICATION forming part of Letters Patent No. 601,713, dated April 5, 1898.

Application filed September 12, 1896. Serial No. 605,595. (No model.)

*To all whom it may concern:*

Be it known that I, DAVID M. MOTHERWELL, a citizen of the United States, and a resident of Chicago, in the county of Cook and State of Illinois, have invented a certain new and useful Improvement in Cultivators, of which the following is a specification.

My invention relates to cultivators, and is particularly adapted to garden-cultivators capable of being pushed by hand. Its object is to provide a cultivator which shall be economical in construction and efficient in service and in which all desirable adjustments may be conveniently made.

One portion of the invention consists of a gusset-plate, to which are connected a wheel, a handle-frame, and a working tool.

Another part of the invention consists in the tooth-frame for carrying the cultivator-blades.

The combinations of parts definitely pointed out in the claim also describe wherein the invention consists, and I do not wish to be understood as limiting myself to the form herein shown further than is specified in the claim.

The drawings show the best form of my invention at present known to me.

Figure 1 is an elevation, and Fig. 2 a plan, of a cultivator embodying the invention. Fig. 3 is a plan of the tooth-frame for carrying the cultivator-blades. Fig. 4 is an elevation showing the manner in which a plow or other tool may be carried instead of several cultivator-teeth. Fig. 5 is a detail view of the gusset-plate.

Similar letters of reference designate similar parts in the several figures.

The handle-frame A, by which the cultivator is pushed, is pivoted at $a$ to a gusset-plate B, preferably made of steel. A bolt $c$ passes through the handle-frame and through a slot $d$ in the gusset-plate, and this provides an adjustment for the handle-frame. Pivoted at $e$ to the forward end of the gusset-plate is the fork E of the wheel D. This fork is similarly adjusted by the bolt $g$, passing through it and the slot $h$. To this gusset-plate is bolted, by means of two of the three holes $i$, $i^2$, and $i^3$, a standard for supporting the working tooth, the form of standard varying with the number and kind of teeth.

When it is desired to carry several cultivator-teeth, I bolt to the gusset-plate, by means of the holes $i^2$ and $i^3$, a tooth-frame of the form shown in Fig. 3. This tooth-frame consists of the bars $k\ k$ and the tool-standards $s'$ to $s^5$, secured thereto, as shown. These bars are each bent to form a succession of open quadrangles facing in opposite directions, and though the bends do not make right angles, preferably, I think it will be clear to describe the bars as being in a crenelated form, or approximately so. The bars are placed opposite each other and bolted together through the interposed gusset-plate and through the standard $s'$. Borrowing terms from the art of fortifications, I will call that bend of the bar which is proximate to the center line of the frame and parallel thereto a "crenel" and that bend parallel to the center line, but distant from it, a "merlon." Two standards $s^2$ and $s^3$ are bolted to the rear merlon of each bar. These standards carry teeth tracking directly beneath them. To the forward merlon of each bar are bolted the flaring standards $s^4$ and $s^5$. The teeth which these standards carry preferably track the same distance outside the teeth on $s^2$ and $s^3$ that the latter do outside the tooth on $s'$, the teeth being thus in "echelon." The other standards are bolted on the outside of the bars, as shown. To the lower ends of the standards cultivator-teeth are bolted in the usual manner. If desired, the two front arms $l\ l$ of the bars $k\ k$ may be omitted and the frame carry but three standards and three teeth. When it is desired to use one tooth—as, for instance, a thistle-sweep or plow—I carry the same on a single standard M, bolted through the holes $i'$ and $i^2$ in the gusset-plate, as shown in Fig. 4. This standard preferably consists of a bar of metal bent back upon itself, so as to be double, and leaving a slot between the two arms about equal in width to the thickness of the gusset-plate, which it thus embraces. This slot is widened at the bottom to allow the passage of the bolt $p$, which secures the tooth, and this opening being elongated there is thus formed an adjustable connection between the tooth and the standard.

The two kinds of standards shown are adapted to carry almost every sort of working tooth that could be desired. Other forms of standards, however, may be bolted to the gusset-plate either by means of the holes shown or by other holes.

Having thus described my invention, what I claim is—

In a cultivator, the vertical plate B having slots $d$ and $h$ and holes $a$ and $e$ by which a handle-frame and wheel are adjustably connected and having another hole for securing a tool-standard, for the purpose specified.

DAVID M. MOTHERWELL.

Witnesses:
ALBERT H. BATES,
CHARLES L. HINE.